Patented July 17, 1934

1,966,752

UNITED STATES PATENT OFFICE 1,966,752

PRODUCTION OF A FOLLICLE HORMONE

Adolf Butenandt, Gottingen, Germany, assignor to Schering-Kahlbaum A. G., Berlin, Germany No Drawing. Application December 4, 1931, Serial No. 579,105. In Germany December 18, 1930

4 Claims. (Cl. 260—131)

My invention refers to a method of producing a follicle hormone and has for its purpose to provide means whereby such a hormone can be produced in a particularly simple and efficient manner.

As is well known to those skilled in the art urine and other body liquids contain two hormones, which are capable of producing the cycle of rut in gelded animals. These hormones can be recovered according to methods which are described for instance in my pamphlet entitled "Untersuchungen über das weibliche Sexualhormon" (Berlin 1931). One of these hormones has the constitution $C_{18}H_{24}O_3$ and melts at 268–269° C. Its structural formula may be supposed to be

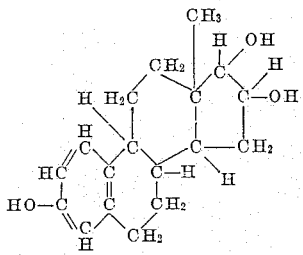

Its production was described by Marrian and others in Journ. of Physiol., 67, p. 389, in Biochem. Journ., 23, p. 1090 and 24, p. 435 and 1021. The other has the formula $C_{18}H_{22}O_2$ and the melting point of 240° C. Its structural formula is at present believed to be

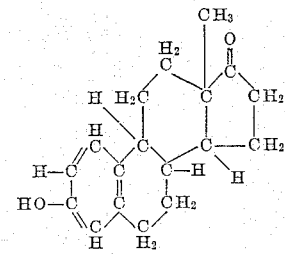

It should, however, be understood that these formulæ are merely given as temporary assumptions and may later be shown to require modifications.

I have now found that the hormone $C_{18}H_{24}O_3$ can be converted into the hormone $C_{18}H_{22}O_2$ by treating it with agents splitting off water. By such conversion the efficiency of the hormone is greatly increased.

The splitting off of the water can be effected by heating the starting material with potassium bisulfate, phosphorus pentoxide etc. or by catalytic action, the vapor being conducted in contact with aluminium oxide, fuller's earth or some other highly porous substance.

Instead of starting from the pure hormone $C_{18}H_{24}O_3$ I can also start from oils or other preparations containing same.

In practising my invention I may for instance proceed as follows:—

Example 1

1 part by weight follicle hormone having the formula $C_{18}H_{24}O_3$ is heated with potassium bisulfate in a high vacuum (not above 0,02 mms. mercury column) to 120° and slowly distilled over into a recipient. One thus obtains 0,85 parts of the hormone having the formula $C_{18}H_{22}O_2$ and melting at 240–243° C.

Example 2

5 grams of an oil containing the hormone having the formula $C_{18}H_{24}O_3$, this oil having an efficiency of 30,000 mice units per gram, are mixed with a highly porous fuller's earth and slowly distilled over into a recipient at about 120° C. in a high vacuum. There are obtained 4 grams of a dark brown oil having an efficiency of 50,000–60,000 mice units per gram.

Example 3

12 milligrams of follicle hormone $C_{18}H_{24}O_3$ are intimately triturated with 100 milligrams molten potassium bisulfate. The mixture is filled into a retort and heated therein under a vacuum of 0,02 mms. mercury column during two hours to 110° C. and thereafter during further 5 hours to 180° C. The hormone formed in the reaction travels by sublimation into the extension of the retort and can be recovered by solution in alcohol. The concentrated alcoholic solution on being sprinkled with water furnishes 9 milligrams of follicle hormone $C_{18}H_{22}O_2$ melting at 250–251° C. (corrected) and having a physiological efficiency of 8 million mice units per gram when injected in oily solution.

Various changes may be made in the details disclosed in the foregoing specification without departing from the invention or sacrificing the advantages thereof.

I claim:—

1. The method of producing a follicle hormone comprising acting on a follicle hormone having the formula $C_{18}H_{24}O_3$ with an agent capable of splitting off one molecule of water.

2. The method of producing a follicle hormone comprising acting on a follicle hormone having the formula $C_{18}H_{24}O_3$ with potassium bisulfate to split off one molecule of water.

3. The method of producing a follicle hormone comprising acting on a follicle hormone having the formula $C_{18}H_{24}O_3$ in the vapor phase with an inorganic finely distributed highly porous substance to split off one molecule of water.

4. The method of producing a follicle hormone comprising acting on a follicle hormone having the formula $C_{18}H_{24}O_3$ in the vapor phase with fuller's earth to split off one molecule of water.

ADOLF BUTENANDT.